United States Patent
Arase (10) Patent No.: US 6,717,904 B2
(45) Date of Patent: Apr. 6, 2004

(54) DISC DRIVING APPARATUS (75) Inventor: Hiroyuki Arase, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 2 days.

(21) Appl. No.: 10/100,077

(22) Filed: Mar. 19, 2002

(65) Prior Publication Data
US 2002/0136140 A1 Sep. 26, 2002

(30) Foreign Application Priority Data
Mar. 21, 2001 (JP) .................... P 2001-080125

(51) Int. Cl.⁷ .............................................. G11B 33/02
(52) U.S. Cl. .................................................... 369/75.2
(58) Field of Search ........................... 369/75.1–75.2, 369/77.1–77.2, 178

(56) References Cited

U.S. PATENT DOCUMENTS 5,970,035 A * 10/1999 Ohmori et al. ............... 369/54

RE37,170 E * 5/2001 Kurosu ....................... 369/77.1
6,256,278 B1 * 7/2001 Furukawa et al. ......... 369/77.1

FOREIGN PATENT DOCUMENTS

JP           10-275390          10/1998

* cited by examiner

Primary Examiner—Allen Cao
(74) Attorney, Agent, or Firm—Morgan, Lewis & Bockius LLP (57) ABSTRACT A disc driving apparatus has a disc tray 1 and a clamp mechanism 5. Rib-like butting portions 17 are downward projected from a front part 15 of a bottom plate portion 12 of the disc tray 1. A flat receiving portion 31 is disposed on a chassis 3 serving as a stationary member. The receiving portion supports from the lower side the butting portions 17 of the disc tray 1 which is advanced to a disc clamping position, thereby preventing the disc tray 1 from downward warping.

11 Claims, 9 Drawing Sheets

DISC DRIVING APPARATUS

BACKGROUND OF THE INVENTION

The present invention relates to a disc driving apparatus, and more particularly to a disc driving apparatus in which a disc such as an optical disc is carried in and out between a disc clamping position and a disc loading/unloading position.

Figure 8:
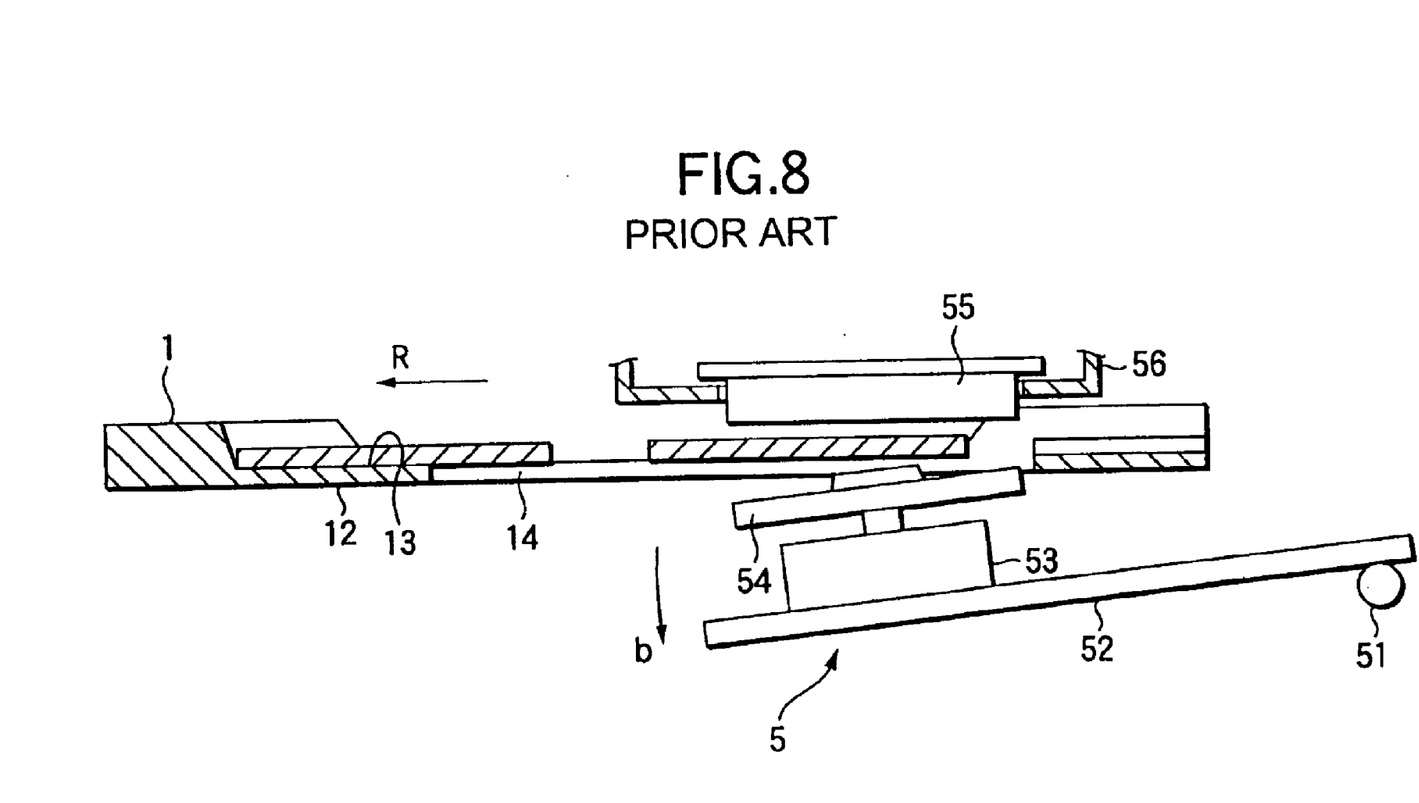
FIG. 8 is a view schematically showing a disc driving apparatus of the conventional art.
Figure 9:
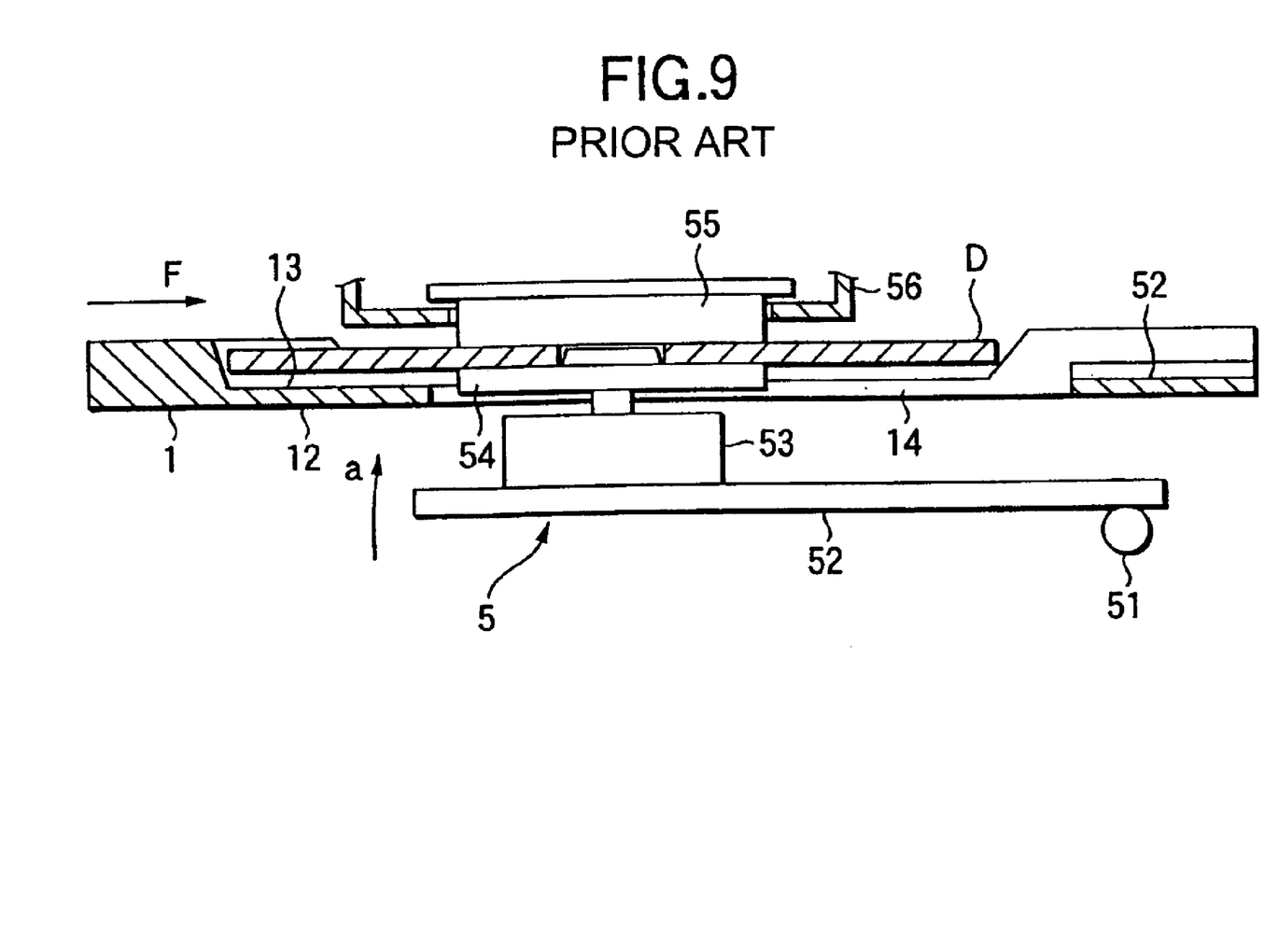
FIG. 9 is a view schematically showing the disc driving apparatus of the conventional art, in another state.
Figure 10:
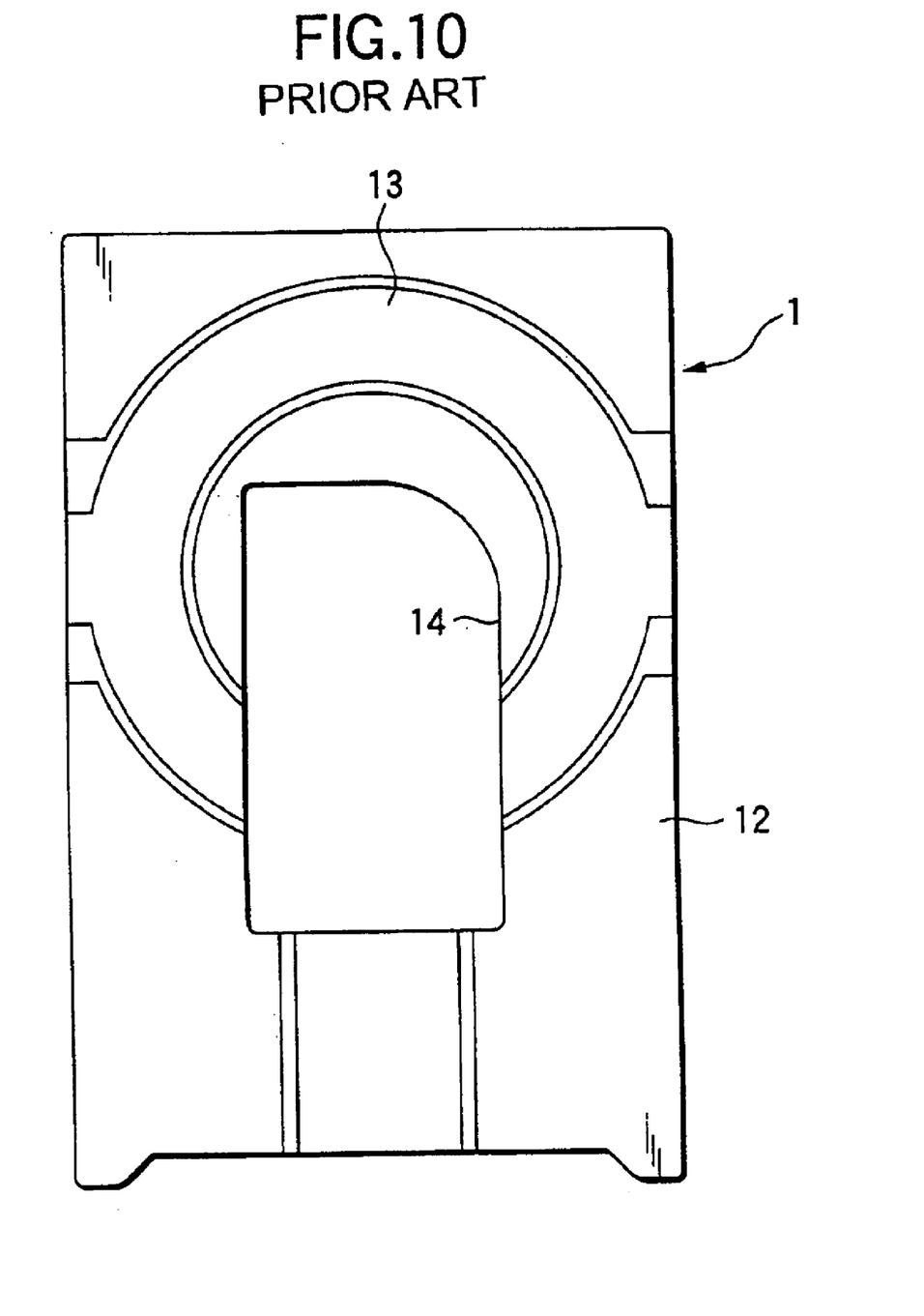
FIG. 10 is a plan view of a disc tray which is used in the disc driving apparatus of the conventional art.

FIGS. 8 and 9 schematically show the basic configuration of a disc driving apparatus in which the usage object is a disc-like recording medium (disc) such as a CD, a DVD, a CD-ROM, a CD-R, or a CD-RW. FIG. 10 is a plan view of a disc tray 1.

As shown in FIG. 10, the disc tray 1 is configured by a synthetic resin molded article which is formed into a substantially rectangular shape in a plan view. A disc mounting area 13 is formed into a circular shape in a front part of a bottom plate portion 12 of the disc tray, and an opening 14 is formed over a range extending from the disc mounting area 13 to a rear portion.

In the disc driving apparatus, the disc tray 1 can be horizontally moved between a disc loading/unloading position which is not shown, and a disc clamping position which is shown in FIG. 9. After the disc tray 1 is advanced to the disc clamping position shown in FIG. 9, a disc D mounted on the disc mounting area 13 of the disc tray 1 is clamped by a clamp mechanism 5.

The illustrated clamp mechanism 5 includes an arm 52 which is vertically swung about a fulcrum 51 in a fixed position, and below the disc tray 1 which is advanced to the disc clamping position as indicated by the arrow F in FIG. 9. A turntable 54 is attached to the rotation shaft of a motor 53 which is mounted on the arm 52. A damper 55 is placed above the disc tray 1 which is advanced to the disc clamping position, so as to be opposed to the turntable 54. The damper 55 is liftably held on a holding member 56.

In the clamp mechanism 5, after the disc D mounted on the disc mounting area 13 of the disc tray 1 is carried in to the disc clamping position, the arm 52 is upward swung as indicated by the arrow a in FIG. 9, whereby the turn table 54 is caused to enter the opening 14 of the disc tray 1 to raise the disc D from the disc mounting area 13 of the disc tray 1. The raised disc D pushes up the clamper 55 so that the clamper is slightly raised from the holding member 56. Under this state, the disc D is clampingly held between the turntable 54 and the damper 55 by the attractive force due to a magnet disposed in the turntable 54 or the damper 55.

In such a disc driving apparatus, the vertical swinging amplitude of the arm 52 of the clamp mechanism 5 is limited in order to reduce the thickness of the whole shape of the apparatus. The disc tray 1 is moved between the disc loading/unloading position and the disc clamping position while the end portions in the width direction of the disc tray are guided. Therefore, a center portion in the width direction of the disc tray 1 may be caused by its own weight to warp into a downward protruded shape. When the disc tray 1 is formed by a molded article of an economical synthetic resin of general purpose grade, particularly, the possibility that such warpage occurs is raised. In the case where warpage such as described above occurs in the disc tray 1, depending on the degree of the warpage, the deformed portion which is downward protruded interferes with the turn table 54 or another mechanical component when the disc tray is advanced to the disc clamping position or retracted therefrom, whereby the stability of the disc loading operation or the disc unloading operation is impaired or such an operation is not smoothly conducted.

The Unexamined Japanese Patent Application Publication No. Hei 10-275390 discloses a disc driving apparatus having a structure which is similar to that of the disc driving apparatus described with reference to FIGS. 8 and 9. In the disclosed apparatus, as shown in FIG. 8, a guide face which is upward inclined as forward moving is formed on the side of the disc tray 1 in order to prevent the disc tray 1 from interfering with the damper 55 to cause a malfunction when the disc tray 1 is retracted from the disc clamping position to the disc loading/unloading position as indicated by the arrow R. When the disc tray 1 is retracted as indicated by the arrow R, the retracting operation is conducted while the guide face slides over the damper 55 to push up the damper 55.

The technique disclosed in the publication is merely a technique which prevents a maloperation due to interference between the disc tray 1 and the damper 55 placed above the disc tray from occurring. Therefore, the technique cannot be applied to a configuration for preventing a maloperation due to interference between the disc tray 1 and the turn table 54 or another mechanical component placed below the disc tray, from occurring. Such interference is caused by downward projecting warping of the disc tray 1 such as that described above.

SUMMARY OF THE INVENTION

The invention is conducted under the above-described circumstances. It is an object of the invention to provide a disc driving apparatus in which a disc tray that is advanced to a disc clamping position is prevented from warping to be downward projected, whereby the stabilities of the disc loading operation and the disc unloading operation are enhanced.

It is another object of the invention to provide a disc driving apparatus in which a warping disc tray can be surely prevented from interfering in a disc clamping position with a turn table or another mechanical component placed below the disc tray.

It is a further object of the invention to provide a disc driving apparatus in which the stabilities of the disc loading operation and the disc unloading operation are excellent even when a disc tray is formed by a synthetic resin molded article and an economical synthetic resin of general purpose grade is used.

The disc driving apparatus of the invention includes: a disc tray which is movable between a disc clamping position and a disc loading/unloading position; and a clamp mechanism which clamps a disc that is mounted on the disc tray and carried in to the disc clamping position. The apparatus has disc supporting member for supporting the disc tray which is advanced to the disc clamping position, from a lower side of the disc tray, thereby preventing the disc tray from downward warping.

In the disc driving apparatus, the disc tray which is advanced to the disc clamping position is supported from the lower side to be prevented from downward warping, by the function of the disc supporting member. Therefore, there is no possibility that the disc tray downward warps to interfere with a mechanical component placed below the disc tray, such as a turn table. As a result, the disc loading operation and the disc unloading operation are stabilized, and the reliabilities of the operations are improved.

Preferably, the disc supporting member may have: a butting portion which is downward projected from the disc tray; and a receiving portion which is disposed on a stationary member, which is relatively slidable with respect to the butting portion, and which receives the butting portion. In this case, the butting portion can be formed into a rib-like shape which longitudinally elongates, and the receiving portion can be formed integrally with a chassis serving as the stationary member. When such a configuration is employed, it is not necessary to use the butting portion or the receiving portion which is formed as a separate component, and hence the reliabilities of the disc loading operation and the disc unloading operation can be enhanced without increasing the number of components. Therefore, it is possible to economically provide a disc driving apparatus having an excellent operation reliability.

In the embodiment, it is possible to employ a configuration in which the disc supporting member has: a butting portion which is formed by a lower face of the disc tray; and a receiving portion which is upward projected from the stationary member, which is relatively slidable with respect to the butting portion, and which receives the butting portion. In this case, the receiving portion can be formed on a chassis serving as the stationary member and into a rib-like shape which longitudinally elongates. According to the configuration also, it is not necessary to use the butting portion or the receiving portion which is formed as a separate component, and hence the reliabilities of the disc loading operation and the disc unloading operation can be enhanced without increasing the number of components. Therefore, it is possible to economically provide a disc driving apparatus having an excellent operation reliability.

Preferably, the disc tray may have an opening which is used in the clamping operation of the clamp mechanism, in a bottom plate portion having a disc mounting area, and the butting portion may be disposed in a part on a front side of the opening. The disc tray warps to interfere with a mechanical component below the disc tray, only when the part of the disc tray on the front side of the opening warps. When the butting portion is disposed only on the part on the front side of the opening, therefore, the above-mentioned operation reliability can be ensured.

In the invention, the clamp mechanism may include an arm which is upward swung during a disc clamping operation, and the disc supporting member may be disposed on the arm. In this case, preferably, the disc supporting member may be configured by a support member which is disposed on the arm, and which supports the disc tray from a lower side of the disc tray when the disc clamping operation of the clamp mechanism is ended, thereby preventing the disc tray from downward warping. According to the configuration, it is not required to take a special countermeasure on the disc tray, the chassis serving as the stationary member, or the like.

In the invention, the following three modes may be employed.

One of the modes is a disc driving apparatus including: a disc tray which is movable between a disc clamping position and a disc loading/unloading position; and a clamp mechanism which clamps a disc that is mounted on the disc tray and carried in to the disc clamping position, wherein an opening which is used in the clamping operation of the clamp mechanism is formed in a bottom plate portion of the disc tray, the bottom plate portion having a disc mounting area, a rib-like butting portion in which a front end is formed as an inclined guide face, and which longitudinally elongates is downward projected from a part on a front side of the opening, a flat receiving portion is disposed on a chassis serving as a stationary member, the receiving portion supporting from a lower side the butting portion of the disc tray which is advanced to the disc clamping position, thereby preventing the disc tray from downward warping, and the butting portion and the receiving portion are relatively slidable with respect to each other.

Another one of the modes is a disc driving apparatus including: a disc tray which is movable between a disc clamping position and a disc loading/unloading position; and a clamp mechanism which clamps a disc that is mounted on the disc tray and carried in to the disc clamping position, wherein an opening which is used in the clamping operation of the clamp mechanism is formed in a bottom plate portion of the disc tray, the bottom plate portion having a disc mounting area, a flat lower face on a front side of the opening is formed as a butting portion, a rib-like receiving portion which longitudinally elongates is disposed on a chassis serving as a stationary member, the receiving portion supporting from a lower side the butting portion of the disc tray which is advanced to the disc clamping position, thereby preventing the disc tray from downward warping, a rear end of the receiving portion is formed as an inclined guide face, and the butting portion and the receiving portion are relatively slidable with respect to each other.

A further one of the modes is a disc driving apparatus including: a disc tray which is movable between a disc clamping position and a disc loading/unloading position; and a clamp mechanism which clamps a disc that is mounted on the disc tray and carried in to the disc clamping position, wherein the clamp mechanism includes an arm which is upward swung during a disc clamping operation, and an upward projection is disposed on the arm, the projection supporting the disc tray from a lower side of the disc tray when the disc clamping operation of the clamp mechanism is ended, thereby preventing the disc tray from downward warping.

BRIEF DESCRIPTION OF THE DRAWINGS

[FIG. 1]

[FIG. 2]

[FIG. 3]

[FIG. 4]

[FIG. 5]

[FIG. 6]

[FIG. 7]

[FIG. 8]

[FIG. 9]

[FIG. 10]

DETAILED DESCRIPTION OF THE PREFERRED EMBODIMENTS (First Embodiment)

Figure 1:
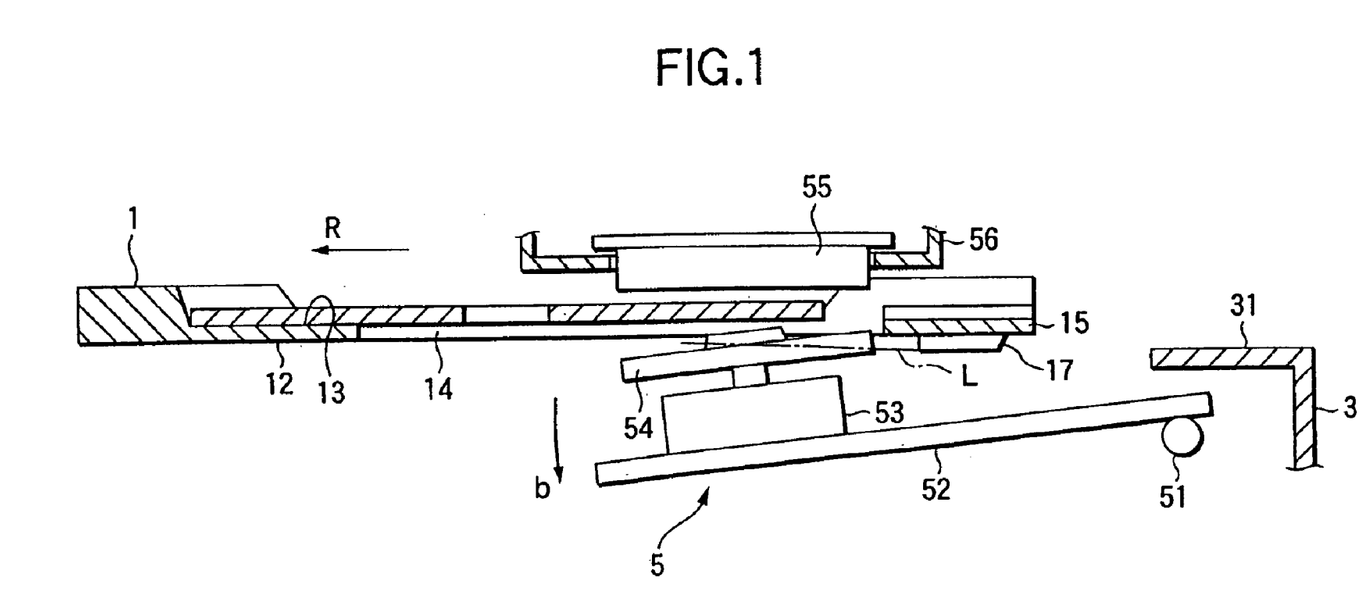
FIG. 1 is a view showing the configuration of a disc driving apparatus which is a first embodiment of the invention.
Figure 2:
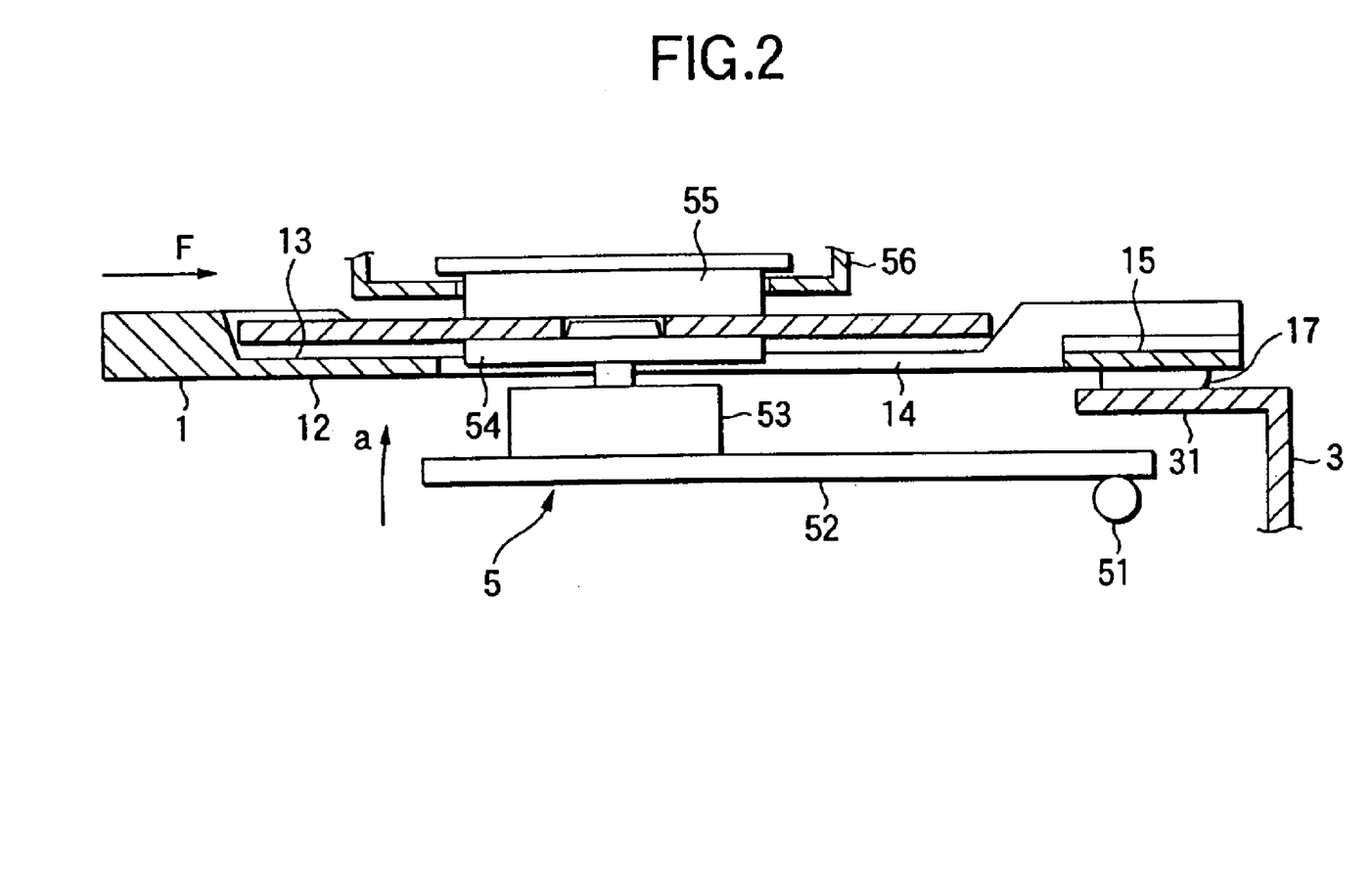
FIG. 2 is a view showing the configuration of the disc driving apparatus which is the first embodiment, in another state.
Figure 3:
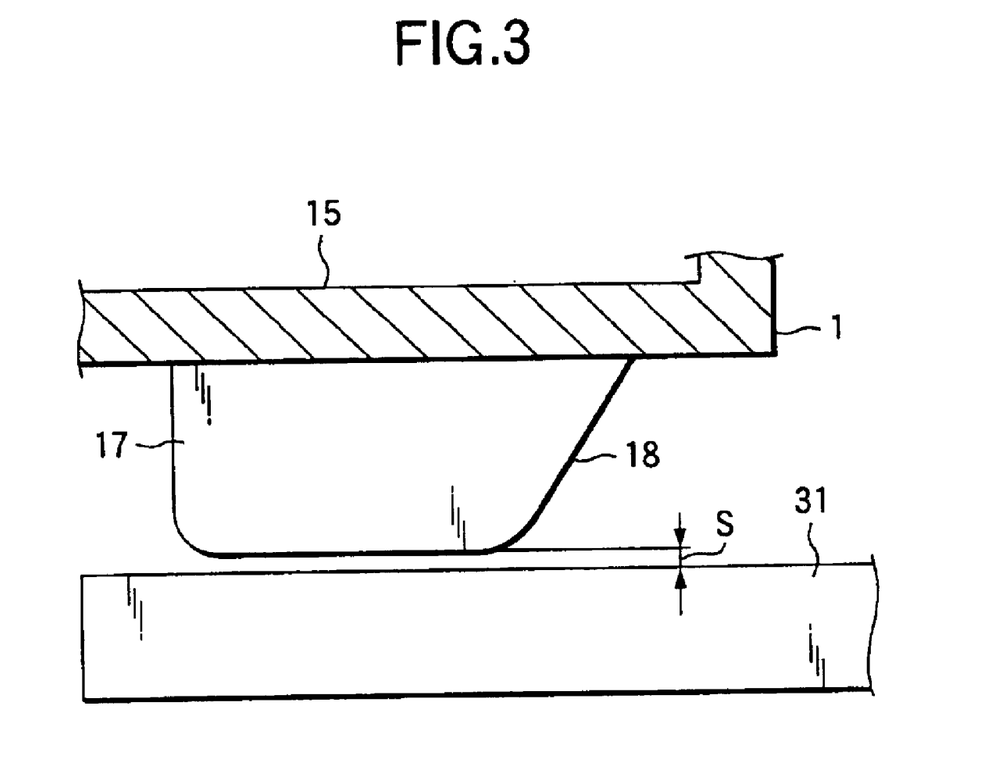
FIG. 3 is an enlarged view showing main portions of FIG. 2.
Figure 4:
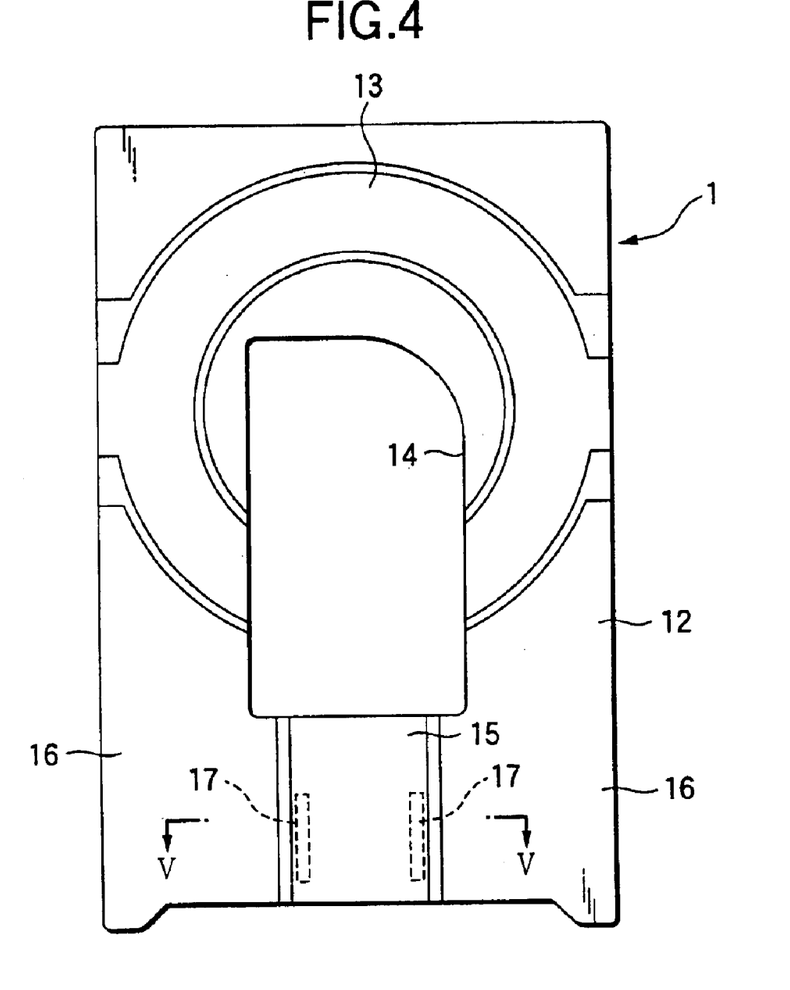
FIG. 4 is a plan view of a disc tray.
Figure 5:
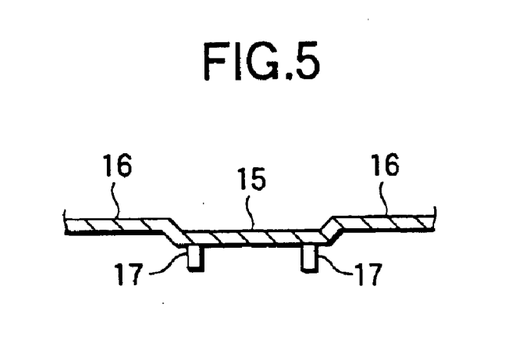
FIG. 5 is a section view taken along the line V—V of FIG. 4.

FIGS. 1 and 2 are views showing the configuration of a disc driving apparatus which is a first embodiment of the invention, FIG. 3 is an enlarged view showing main portions of FIG. 2, FIG. 4 is a plan view of a disc tray 1, and FIG. 5 is a section view taken along the line V—V of FIG. 4.

As shown in FIGS. 4 and 5, in the disc tray 1, the upper face of a part 15 of a bottom plate portion 12 on a front side of an opening 14 is positioned in a lower level than the upper faces of both side parts 16. Rib-like butting portions 17 which longitudinally elongate are downward projected from lateral sides of the lower face of the front part 15, respectively. As shown in FIG. 3 in an enlarged manner, the front end of each of the butting portions 17 is formed as an inclined guide face 18 which is upward inclined as forward moving. By contrast, as shown in FIGS. 1 and 2, a receiving portion 31 which is formed by a flat portion of a chassis 3 serving as a stationary member is placed in an area facing the butting portions 17 of the disc tray 1 which is advanced to a disc clamping position. The right and left butting portions 17 disposed on the disc tray 1 are placed in positions which, when the disc tray 1 is moved between the disc clamping position and a disc loading/unloading position, do not interfere with a turn table 54 placed in a standby position shown in FIG. 1. Namely, when the lower end of the butting portion 17 follows a route L indicated by a long and short dash line in FIG. 1 during a process of moving the disc tray 1 between the disc clamping position and the disc loading/unloading position, there is no possibility that the butting portion 17 interferes with the turn table 54. The other configuration of the disc tray 1 and the disc driving apparatus is identical with that of the conventional art which has been described with reference to FIGS. 8 to 10. Therefore, the identical components are denoted by the same reference numerals, and duplicate description will be omitted.

In the disc driving apparatus, when the disc tray 1 is advanced to the disc clamping position as indicated by the arrow F in FIG. 2, the butting portions 17 of the disc tray 1 are vertically opposed to the flat receiving portion 31 of the chassis 3 as shown in the figure, and the receiving portion 31 supports the butting portions 17 from the lower side, whereby the front part 15 of the bottom plate portion 12 of the disc tray 1 is prevented from warping into a downward projected shape. Therefore, the front part 15 of the disc tray 1 never warps. This function is exerted also when the disc tray 1 is formed by a molded article of an economical synthetic resin of general purpose grade.

In the case where the front part 15 of the disc tray 1 warps to a degree at which the part does not interfere with mechanical components (such as the turn table 54) below the disc tray 1, when the disc tray 1 is advanced to the disc clamping position, the front ends of the butting portions 17 bump against the end of the receiving portion 31. Since the front ends of the butting portions 17 are formed as the inclined guide faces 18 as shown in FIG. 3, however, the inclined guide faces 18 exert a function of allowing the butting portions 17 to smoothly ride over the receiving portion 31, and hence the butting portions 17 smoothly ride over the receiving portion 31. Consequently, there occurs no situation where the front ends of the butting portions 17 bump against the receiving portion 31 to impair the disc loading operation.

In the embodiment, as shown in FIG. 3, a small gap S is ensured between the lower ends of the butting portions 17 and the upper face of the receiving portion 31. According to this configuration, when the disc tray 1 is advanced to the disc clamping position or retracted therefrom, the butting portions 17 do not slide over the receiving portion 31, and hence a load due to sliding between these portions is not produced. This is useful for improving the smoothness of the disc loading operation and the disc unloading operation. The gap S must be set to have a size at which, even when the front part 15 of the disc tray 1 warps to a degree corresponding to the size, the disc tray 1 does not interfere with the mechanical components (such as the turn table 54) below the disc tray 1.

(Second Embodiment)

Figure 6:
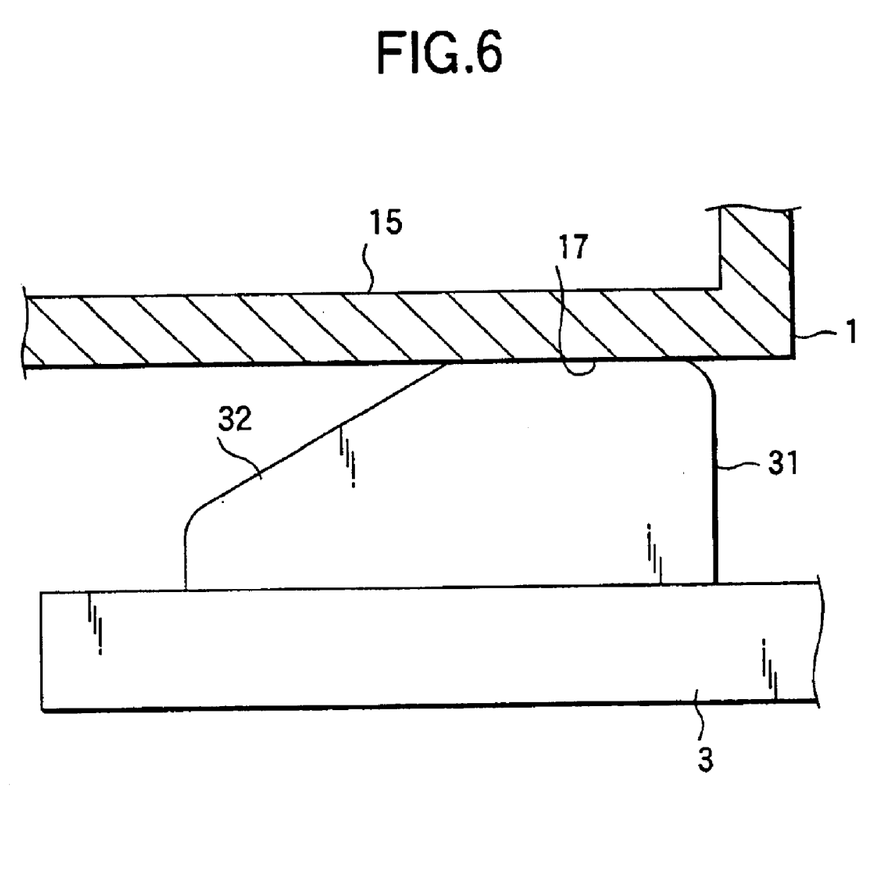
FIG. 6 is an enlarged view showing main portions of a disc driving apparatus which is a second embodiment.

FIG. 6 is an enlarged view showing main portions of a disc driving apparatus which is a second embodiment. In the embodiment, the flat lower face of the part 15 of the disc tray on the front side of the opening is formed as a butting portion 17, and a rib-like receiving portion 31 which longitudinally elongates is disposed on a flat portion of a chassis serving as a stationary member. The rib-like receiving portion supports from a lower side the butting portion 17 of the disc tray 1 which is advanced to the disc clamping position, thereby preventing the disc tray 1 from downward warping. The rear end of the receiving portion 31 is formed as a guide face 32 which is upward inclined as forward moving. The other items are identical with those of the first embodiment described with reference to FIGS. 1 to 5. Therefore, the identical components are denoted by the same reference numerals.

In the second embodiment, when the disc tray 1 is advanced to the disc clamping position, the butting portion 17 of the disc tray 1 is vertically opposed to the receiving portion 31 of the chassis 3 as shown in FIG. 6, and the receiving portion 31 supports the butting portion 17 from the lower side, whereby the front part 15 of the bottom plate portion 12 of the disc tray 1 is prevented from warping into a downward projected shape. Therefore, the front part 15 of the disc tray 1 never warps. This function is exerted also when the disc tray 1 is formed by a molded article of an economical synthetic resin of general purpose grade.

In the case where the front part 15 of the disc tray 1 warps to a degree at which the part does not interfere with mechanical components (such as the turn table 54) below the disc tray 1, when the disc tray 1 is advanced to the disc clamping position, the front end of the butting portion 17 (the front end of the disc tray 1) bumps against the end of the receiving portion 31. Since the rear end of the receiving portion 31 is formed as the inclined guide face 32, however, the inclined guide face 32 exerts a function of allowing the butting portion 17 to smoothly ride over the receiving portion 31, and hence the butting portion 17 smoothly rides over the receiving portion 31. Consequently, there occurs no situation where the front end of the disc tray 1 bumps against the receiving portion 31 to impair the disc loading operation.

In the second embodiment also, the gap S which has been described with reference to FIG. 3 may be ensured between the butting portion 17 and the upper face of the receiving portion 31. According to this configuration, a load due to sliding between these portions is not produced. This is useful for improving the smoothness of the disc loading operation and the disc unloading operation.

(Third Embodiment)

Figure 7:
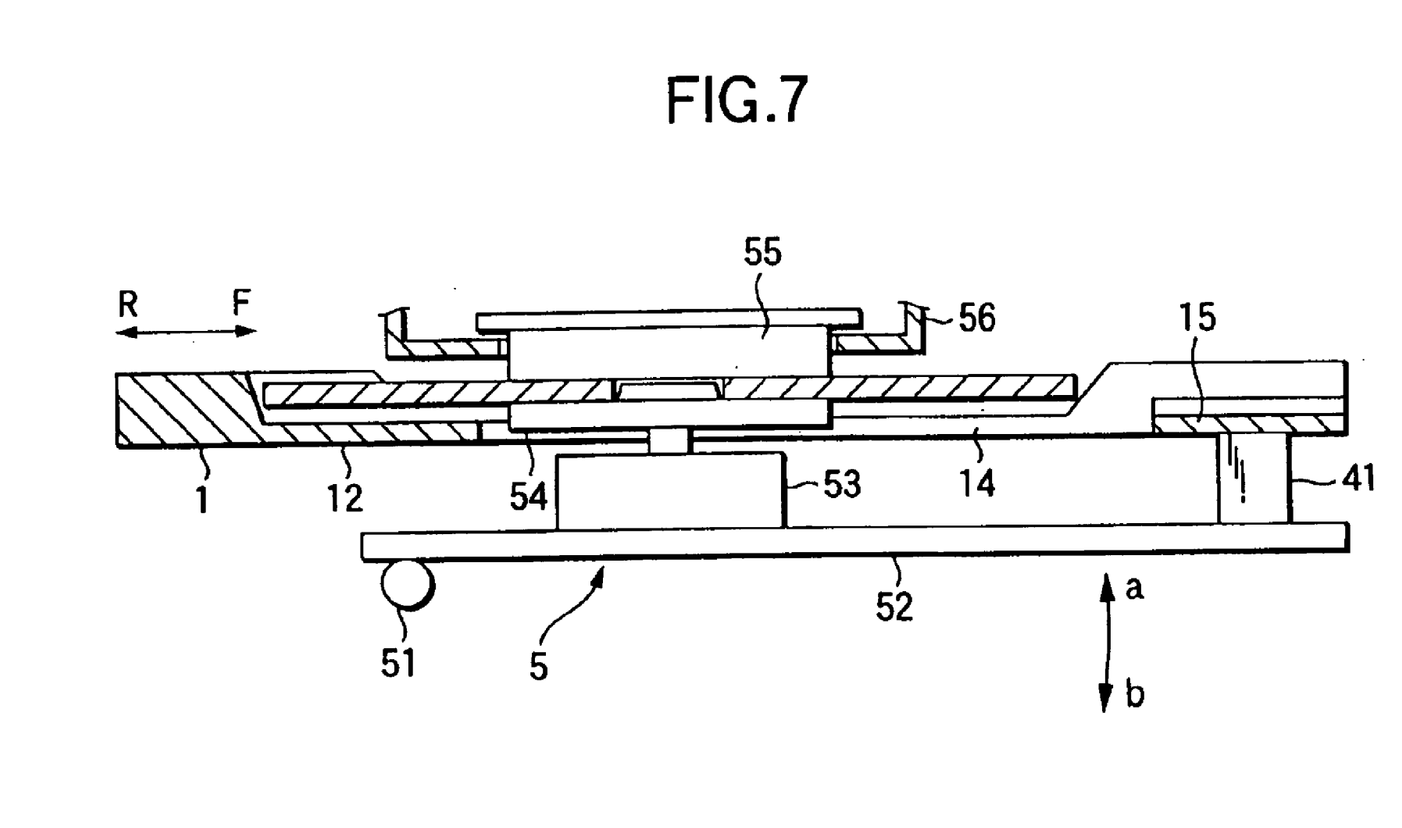
FIG. 7 is a view of a disc driving apparatus which is a third embodiment.

FIG. 7 is a view of a disc driving apparatus which is a third embodiment. The clamp mechanism 5 includes an arm 52 which is upward swung during the disc clamping operation, and an upward projection 41 is disposed on the arm 52. The upward projection supports from the lower side the part 15 of the bottom plate portion 12 of the disc tray 1 on the front side of the opening 14 when the disc clamping operation of the clamp mechanism 5 is ended, thereby preventing the disc tray 1 from downward warping. The other items are identical with or equivalent to those of the first embodiment described with reference to FIGS. 1 to 5. Therefore, the identical components are denoted by the same reference numerals.

In the third embodiment also, when the disc clamping operation of the clamp mechanism 5 is ended, the front part 15 of the disc tray 1 is supported from the lower side by the upward projection 41 of the arm 52, whereby the front part 15 is prevented from downward warping. This function is exerted also when the disc tray 1 is formed by a molded article of an economical synthetic resin of general purpose grade.

In the third embodiment also, the gap S which has been described with reference to FIG. 3 may be ensured between the upward projection 41 and the lower face of the front part 15 of the disc tray 1. According to this configuration, a load due to sliding between these components is not produced. This is useful for improving the smoothness of the disc loading operation and the disc unloading operation.

As described above, according to the invention, it is possible to provide a disc driving apparatus in which a disc tray that is advanced to a disc clamping position is prevented from warping to be downward projected, and therefore the disc tray does not interfere in the disc clamping position with a turn table or another mechanical component placed below the disc tray, so that the stabilities of the disc loading operation and the disc unloading operation are excellent.

Furthermore, it is possible to provide a disc driving apparatus in which a butting portion or a receiving portion is disposed on a disc tray, a chassis, or the like, or an upward projection is disposed on an arm of a clamp mechanism, whereby the stabilities of the disc loading operation and the disc unloading operation are improved without involving cost increase due to an increased number of parts. Therefore, a disc driving apparatus having a superior operation stability can be economically provided. The invention attains a further effect that, in the case where a disc tray is configured by a synthetic resin molded article, a disc driving apparatus having a superior operation stability can be provided by using an economical synthetic resin of general purpose grade.

What is claimed is:

1. A disc driving apparatus comprising:
   a disc tray which is movable between a disc clamping position and a disc loading/unloading position; and
   a clamp mechanism which clamps a disc that is mounted on said disc tray and carried in to the disc clamping position, wherein
   a bottom plate portion of said disc tray is provided with an opening which is used in the clamping operation of said clamp mechanism, said bottom plate portion having a disc mounting area,
   a rib-like butting portion in which a front end is formed as an inclined guide face, and which longitudinally elongates, is downward projected from a part on a front side of said opening,
   a flat receiving portion is disposed on a chassis serving as a stationary member, said flat receiving portion supporting from a lower side said rib-like butting portion of said disc tray which is advanced to the disc clamping position, and preventing said disc tray from downward warping, and
   said butting portion and said receiving portion are relatively slidable with respect to each other.

2. A disc driving apparatus comprising:
   a disc tray which is movable between a disc clamping position and a disc loading/unloading position; and
   a clamp mechanism which clamps a disc that is mounted on said disc tray and carried in to the disc clamping position, wherein
   a bottom plate portion of said disc tray is provided with an opening which is used in the clamping operation of said clamp mechanism, said bottom plate portion having a disc mounting area,
   a flat lower face on a front side of said opening is formed as a butting portion,
   a rib-like receiving portion, which longitudinally elongates, is disposed on a chassis serving as a stationary member, said rib-like receiving portion supporting from a lower side said butting portion of said disc tray which is advanced to the disc clamping position, and preventing said disc tray from downward warping,
   a rear end of said receiving portion is formed as an inclined guide face, and
   said butting portion and said receiving portion are relatively slidable with respect to each other.

3. A disc driving apparatus comprising:
   a disc tray which is movable between a disc clamping position and a disc loading/unloading position; and
   a clamp mechanism which clamps a disc that is mounted on said disc tray and carried in to the disc clamping position, wherein
   said clamp mechanism includes:
     an arm which is upward swung during a disc clamping operation, and
     an upward projection disposed on said arm, said projection supporting said disc tray from a lower side of said disc tray when the disc clamping operation of said clamp mechanism is ended, for preventing said disc tray from downward warping.

4. A disc driving apparatus comprising:
   a disc tray which is movable between a disc clamping position and a disc loading/unloading position;
   a clamp mechanism which clamps a disc that is mounted on said disc tray and carried in to the disc clamping position; and
   disc supporting member for supporting said disc tray which is advanced to the disc clamping position from a lower side of said disc tray, for preventing said disc tray from downward warping, wherein
   said disc supporting member includes:
     a butting portion downward projected from said disc tray; and
     a receiving portion disposed on a stationary member, which is relatively slidable with respect to said butting portion and receives said butting portion.

5. The disc driving apparatus according to claim 4, wherein
said butting portion is formed into a rib-like shape which longitudinally elongates, and
said receiving portion is formed integrally with a chassis serving as said stationary member.

6. The disc driving apparatus according to claim 4, wherein
said disc tray has an opening which is used in the clamping operation of said clamp mechanism, in a bottom plate portion having a disc mounting area, and
said butting portion is disposed in a part on a front side of said opening.

7. A disc driving apparatus comprising:
a disc tray which is movable between a disc clamping position and a disc loading/unloading position;
a clamp mechanism which clamps a disc that is mounted on said disc tray and carried in to the disc clamping position; and
disc supporting member for supporting said disc tray which is advanced to the disc clamping position from a lower side of said disc tray, for preventing said disc tray from downward warping, wherein
said disc supporting member has:
a butting portion which is formed by a lower face of said disc tray; and
a receiving portion which is upward projected from said stationary member, which is relatively slidable with respect to said butting portion and receives said butting portion.

8. The disc driving apparatus according to claim 7, wherein
said receiving portion is formed into a rib-like shape which is integrated with a chassis serving as said stationary member, and longitudinally elongates.

9. The disc driving apparatus according to claim 7, wherein
said disc tray has an opening which is used in the clamping operation of said clamp mechanism, in a bottom plate portion having a disc mounting area, and
said butting portion is disposed in a part on a front side of said opening.

10. A disc driving apparatus comprising:
a disc tray which is movable between a disc clamping position and a disc loading/unloading position;
a clamp mechanism which clamps a disc that is mounted on said disc tray and carried in to the disc clamping position; and
disc supporting member for supporting said disc tray which is advanced to the disc clamping position from a lower side of said disc tray, for preventing said disc tray from downward warping, wherein said clamp mechanism comprises:
an arm which is upward swung during a disc clamping operation, and
said disc supporting member disposed on said arm.

11. The disc driving apparatus according to claim 10, wherein
said disc supporting member comprises:
a support member disposed on said arm, said support member supporting said disc tray from a lower side of said disc tray when the disc clamping operation of said clamp mechanism is ended, for preventing said disc tray from downward warping.

* * * * *